(12) United States Patent
Mege et al.

(10) Patent No.: US 9,391,740 B2
(45) Date of Patent: Jul. 12, 2016

(54) METHOD FOR DEMODULATING A SIGNAL

(71) Applicant: AIRBUS DS SAS, Elancourt (FR)

(72) Inventors: Philippe Mege, Bourg la Reine (FR); Laurent Martinod, Le Chesney (FR)

(73) Assignee: AIRBUS DS SAS, Elancourt (FR)

( * ) Notice: Subject to any disclaimer, the term of this patent is extended or adjusted under 35 U.S.C. 154(b) by 0 days.

(21) Appl. No.: 14/769,538

(22) PCT Filed: Feb. 20, 2014

(86) PCT No.: PCT/FR2014/000041
§ 371 (c)(1),
(2) Date: Aug. 21, 2015

(87) PCT Pub. No.: WO2014/128369
PCT Pub. Date: Aug. 28, 2014

(65) Prior Publication Data
US 2016/0013888 A1    Jan. 14, 2016

(30) Foreign Application Priority Data

Feb. 22, 2013  (FR) ...................................... 13 51578

(51) Int. Cl.
*H04L 27/06*  (2006.01)
*H04L 1/00*   (2006.01)
*H04B 7/08*   (2006.01)
*H04L 25/03*  (2006.01)
*H04L 27/26*  (2006.01)

(52) U.S. Cl.
CPC ............ *H04L 1/0055* (2013.01); *H04B 7/0848* (2013.01); *H04B 7/0851* (2013.01); *H04B 7/0854* (2013.01); *H04L 25/03171* (2013.01); *H04L 27/2649* (2013.01)

(58) Field of Classification Search
CPC .. H04L 25/067; H04L 1/0054; H04L 27/2647

USPC .......................................... 375/341, 340, 316
See application file for complete search history.

(56) References Cited

U.S. PATENT DOCUMENTS

| | | | |
|---|---|---|---|
| 6,437,737 B1 * | 8/2002 | Azzarelli et al. .............. | 342/360 |
| 2003/0142755 A1 | 7/2003 | Chi et al. | |
| 2008/0108314 A1 * | 5/2008 | Mihota ......................... | 455/101 |
| 2009/0274235 A1 * | 11/2009 | Lee et al. ..................... | 375/267 |
| 2010/0322339 A1 * | 12/2010 | Fety et al. .................... | 375/285 |

FOREIGN PATENT DOCUMENTS

| | | |
|---|---|---|
| EP | 1 530 333 A1 | 5/2005 |
| FR | 2 924 884 A1 | 6/2009 |
| FR | 2 983 667 A1 | 6/2013 |

OTHER PUBLICATIONS

International Search Report as issued in International Patent Application No. PCT/FR2014/000041, dated May 9, 2014.

* cited by examiner

*Primary Examiner* — Helene Tayong
(74) *Attorney, Agent, or Firm* — Pillsbury Winthrop Shaw Pittman LLP

(57) ABSTRACT

A method for demodulating a signal in a receiver including at least two antennas, each receiving a signal, the received signals corresponding to a single emitted signal including symbol frames in which certain symbols, referred to as driver symbols, are known to the receiver, the method including: noise whitening in order to form two combined signals, the noise components of which are separate; normalizing the noise components of the combined signals in order to form two signals, the noise components of which are separate and have equal average standards; and performing signal demodulation with the maximum combination of the signal-to-noise ratio on the two signals, the noise components of which are separate and which have equal average standards, wherein during the first noise-whitening step for forming the two combined signals, the latter are determined retroactively using the maximum criterion.

13 Claims, 3 Drawing Sheets

METHOD FOR DEMODULATING A SIGNAL

CROSS-REFERENCE TO RELATED APPLICATIONS

This is the U.S. National Stage of PCT/FR2014/000041, filed Feb. 20, 2014, which in turn claims priority to French Patent Application No. 1351578, filed Feb. 22, 2013, the entire contents of all applications are incorporated herein by reference in their entireties.

TECHNICAL FIELD

This invention relates to a method for demodulating a signal.

It also relates to a multi-antenna receiving equipment and a corresponding computer programme.

The field of the invention is that of the encoding of digital data, intended to be transmitted in particular in the presence of transmission noise, and of the decoding of said digital data after transmission.

The invention more particularly but not in a limited manner relates to the field of optimising the transmission of digital data, for example via a broadband radio network.

PRIOR ART

A multi-antenna receiver comprises at least two receiving antennas in order to receive replicas of the same emitted signal, introducing as such additional diversity having for effect to improve the quality of the reception. The additional diversity provided is either a space diversity if the antennas are sufficiently spaced apart, or a polarisation diversity if the antennas are collocated and polarised differently, or both a portion of one and of the other of these two types of diversity.

The invention relates more particularly to multi-carrier transmission systems, for example of the OFDM type (Orthogonal Frequency Division Multiplexing). This multi-carrier transmission provides a frequency diversity that is separate from the space diversity and/or polarisation diversity provided by the use of several receiving antennas.

This type of transmission is increasingly used. It has in particular been adopted in the LTE ("Long Term Evolution"), TEDS ("TETRA Enhanced Data Service"), DAB ("Digital Audio Broadcasting") and DVB-T ("Digital Video Broadcasting-Terrestrial") systems.

In OFDM transmission systems, the data is in general organised into frames. In each frame, certain symbols, distributed in the temps-frequency plane are inserted among the useful information intended for the receiver. These symbols, referred to as "driver symbols" are known to the emitter and to the receiver. They are generally used for the purposes of synchronisation and estimation of the propagation channel.

The noise and interferences that the signal is subjected to during its propagation between the emitter and the receiver degrade the reception of the signal. An insufficient processing of the noise component and of the interference then generates a high demodulation and decoding error rate.

Conventionally, the noise component and the interference are processed by comparing a signal resulting from the combination of the signals received by the antennas of the receiver with an estimate of the signal emitted. This estimate of the signal emitted can be known a priori to the receiver by using for example the driver symbols. The estimate of the signal emitted can also be obtained through a prior treatment of the signals received on the various antennas, for example by means of a technique known as signal demodulation with a maximum combination of the signal ratio (MRC, for "Maximum Ratio Combining").

Patent application FR 11 61062 describes a method for reducing interference. Although the method for reducing interference described in this document is of higher performance than the conventional methods for reducing interference in the case of the signals received with noise from strong interference, the method may not provide performance in certain cases wherein the noise component of the signals received contains little interference.

The purpose of this invention is to overcome at lease this problem raised by prior art.

DISCLOSURE OF THE INVENTION

Such an objective is achieved with a method for demodulating a signal in a receiver comprising at least two antennas each receiving a signal transmitted through an associated radio propagation channel, the signals received corresponding to the same emitted signal comprising time and frequency distributed symbol frames in which certain symbols, referred to as driver symbols, are known to the receiver, said method comprising the steps of:
  noise whitening in order to form two combined signals the noise components of which are separate;
  normalising the noise components of the combined signals in order to form two signals the noise components of which are separate and have equal average standards;
  performing signal demodulation with the maximum combination of the signal-to-noise ratio on the two signals, the noise components of which are separate and which have equal average standards characterised in that the first step of noise whitening for forming the two combined signals comprises sub-steps of:
  weighting of each one of the signals received with respective first weighting vectors associated with a respective antenna of the receiver, the signal associated with the first antenna being weighted by a vector $w_1$ and the signal associated with the second antenna being weighted by a vector $w_2$,
  combining weighted received signals in order to form a first combined signal ($c_1$),
  weighting a reference signal comprising said driver symbols with another weighting vector ($W_d$),
  comparing the first combined signal and the weighted reference signal in order to form an error ($\epsilon$), and
  determining weighting vectors ($w_1$, $w_2$ and $w_d$) using the maximum a posteriori criterion by maximising the probability of the occurring of said weighting vectors conditionally with the error obtained,
  weighting of each signal received with second weighting vectors, the signal received on the first antenna being weighted by the conjugate of the complex vector $w_2$ and the signal received on the first antenna being weighted by the opposite of the conjugate of the complex vector $w_1$,
  combining received signals weighted by the second weighting vectors in order to form a second combined signal ($c_2$).

Driver symbol means any symbol known to the receiver, in particular both the driver symbols such as designated in the standards of known OFDM systems such as LTE and TEDS, and/or synchronisation symbols and/or symbols already demodulated and decided by the receiver in a prior processing step.

Thanks to the use of the maximum a posteriori approach (this can be referred to as MAP, for Maximum A Posteriori), this invention makes it possible to optimally reduce the level of the interferences in a multi-antenna receiver and as such improve the Signal to Interference plus Noise Ratio (SINR).

The method described hereinabove makes it possible to obtain two signals $c_1$ and $c_2$ of which the noise components are orthogonal between them. The signal $c_1$ has a level of interference that is optimally reduced and the signal $c_2$ of which the noise is orthogonal on each symbol therefore has a maximum level of interference. No information is lost when this combination is considered.

Thanks to the use of the signal-to-noise ratio maximum combination approach (Maximum Ratio Combining or MRC) in a combination of signals such has just been described, i.e. of two signals with one having a noise component of which the level of interference is optimally reduced, the other a noise component comprising a maximum level of interference, and to the normalising of the noise components of these two signals, the method proposed responds to the problem raised by prior art.

As such, the method performs in all of the cases, including when the noise component of the signals received contains little interference.

In a preferred embodiment, the respective coefficients ($\alpha_1$ and $\alpha_2$) of the channel seen by the useful signal associated with a respective antenna of the receiver and used in the step of performing signal demodulation with the maximum combination of the signal-to-noise ratio on the two signals, r' and r", obtained at the end of the noise-whitening step, can be determined using the maximum a posteriori criterion by maximising the probability of the occurring of the channel ($\alpha_1$ and $\alpha_2$) conditionally with the error present on the one hand in the signal $c_1$ and on the other hand in the signal $c_2$, by taking into account the propagation channel seen in the signal $c_1$ and in the signal $c_2$.

Preferably, the step of determining the whitening step can comprise the sub-steps of:
- calculating a covariance matrix $G_B$ of the propagation channel;
- calculating a covariance matrix $G_D$ of the product, symbol by symbol, of two propagation channels; and
- determining weighting vectors using covariance matrices $G_B$ and $G_D$.

Indeed, the weighting vectors are homogeneous with the propagation channel. The covariance matrices $G_B$ and $G_D$ make it possible to represent the time and frequency constraints of this channel.

In addition, the step of determining the whitening step can further comprise a sub-step of decomposing the covariance matrix $G_B$ into eigenvectors according to the relationship $G_B = C_B \Lambda_B C_B^H$ wherein $C_B$ is a matrix of eigenvectors of the matrix $G_B$ and $\Lambda_B$ is a diagonal matrix comprising eigenvalues associated with the eigenvectors of the matrix $G_B$ and a sub-step of decomposing the covariance matrix $G_D$ into eigenvectors according to the relationship $G_D = C_D \Lambda_D C_D^H$ wherein $C_D$ is a matrix of eigenvectors of the matrix $G_D$ and $\Lambda$ is a diagonal matrix comprising eigenvalues associated with the eigenvectors of the matrix $G_D$.

These decompositions make it possible to simplify the calculations of the weighting vectors.

Advantageously, the step of determining the whitening step can further comprise a sub-step of extracting a matrix $C'_B$ from the matrix $C_B$ and a matrix $\Lambda'_B$ from the matrix $\Lambda_B$, the matrix $\Lambda'_B$ comprising a determined number $n_B'$ of eigenvalues of $\Lambda_B$ and the matrix $C'^{B'}$ comprising the eigenvectors associated with these $n_B'$ eigenvalues, and a sub-step of extracting a matrix $C'_D$ from the matrix $C_D$ and a matrix $\Lambda'_D$ from the matrix $\Lambda_D$, the matrix $\Lambda'_D$ comprising a determined number $n_D'$ of eigenvalues of $\Lambda_D$ and the matrix $C'_D$ comprising the eigenvectors associated with these $n_D'$ eigenvalues, the weighting vectors then being determined using matrices of eigenvectors $C'_B$ and $C'_D$ and of eigenvalues $\Lambda'_B$ and $\Lambda'_D$.

Preferably, the $n_B'$ eigenvalues retained are the largest eigenvalues of the matrix $\Lambda_B$ and the $n'_D$ eigenvalues retained are the largest eigenvalues of the matrix $\Lambda_D$.

This makes it possible to reduce the complexity of the calculation of the weighting vectors while still minimising performance losses thanks to the fact that the eigenvectors retained in the matrices $C'_B$ and $C'_D$ represent a major portion of the energy, represented by the sum of the eigenvalues retained in the matrices $\Lambda'_B$ and $\Lambda'_D$.

Preferably, $n'_B$ and $n'_D$ are less than or equal to the number of driver symbols in each frame.

In addition, the covariance matrix $G_B$ can be the Kronecker product of a covariance matrix $G_{B,T}$ in the time domain and of a covariance matrix $G_{B,F}$ in the frequency domain and the covariance matrix $G_D$ is the Kronecker product of a covariance matrix $G_{D,T}$ in the time domain and of a covariance matrix $G_{D,F}$ in the frequency domain and the step of determining (28) can comprise the sub-steps of:
- decomposing the covariance matrices $G_{B,T}$ and $G_{B,F}$ into eigenvectors according to the relationships $G_{B,T} = C_{B,T} \Lambda_{B,T} C_{B,T}^H$ and $G_{B,F} = C_{B,F} \Lambda_{B,F} C_{B,F}^H$, wherein:
  - $C_{B,T}$ is a matrix of eigenvectors of the matrix $G_{B,T}$;
  - $\Lambda_{B,T}$ is a diagonal matrix comprising eigenvalues associated with the eigenvectors of the matrix $G_{B,T}$;
  - $C_{B,F}$ is a matrix of eigenvectors of the matrix $G_{B,F}$ and
  - $\Lambda_{B,F}$ is a diagonal matrix comprising eigenvalues associated with the eigenvectors of the matrix $G_{B,F}$;
- extracting of a matrix from the matrix $C'_{B,T}$ and a matrix $\Lambda_{B,T}$ from the matrix $\Lambda_{B,T}$ the matrix $\Lambda_{B,T}$ comprising a determined number $n_{Bt}'$ of the largest eigenvalues of $\Lambda_{B,T}$ and the matrix $C'_{B,T}$ comprising the eigenvectors associated with these $n_{Bt}'$ largest eigenvalues;
- extracting of a matrix $C'_{B,F}$ from the matrix $C_{B,F}$ and a matrix $\Lambda'_{B,F}$ from the matrix $\Lambda_{B,F}$, the matrix $\Lambda'_{B,F}$ comprising a determined number $n_{Bf}'$ of the largest eigenvalues of $\Lambda_{B,F}$ and the matrix $C'_{B,F}$ comprising the eigenvectors associated with these $n_{Bf}'$ largest eigenvalues,
- decomposing of the covariance matrices $G_{D,T}$ and $G_{D,F}$ into eigenvectors according to the relationships $G_{D,T} = C_{D,T} \Lambda_{D,T} C_{D,T}^H$ and $G_{D,F} = C_{D,F} \Lambda_{D,F} C_{D,F}^H$, wherein:
  - $C_{D,T}$ is a matrix of eigenvectors of the matrix $G_{D,T}$;
  - $\Lambda_{D,T}$ is a diagonal matrix comprising eigenvalues associated with the eigenvectors of the matrix $G_{D,T}$;
  - $C_{D,F}$ is a matrix of eigenvectors of the matrix $G_{D,F}$; and
  - $\Lambda_{D,F}$ is a diagonal matrix comprising eigenvalues associated with the eigenvectors of the matrix $G_{D,F}$;
- extracting of a matrix $C'_{D,T}$ from the matrix $C_{D,T}$ and a matrix $\Lambda'_{D,T}$ from the matrix $\Lambda_{D,T}$ the matrix $\Lambda'_{D,T}$ comprising a determined number $n_{Dt}'$ of the largest eigenvalues of $\Lambda_{D,T}$ and the matrix $C'_{D,T}$ comprising the eigenvectors associated with these $n_{Dt}'$ largest eigenvalues; and
- extracting of a matrix $C'_{D,F}$ from the matrix $C_{D,F}$ and a matrix $\Lambda_{D,F}$ from the matrix $\Lambda_{D,F}$, the matrix $\Lambda'_{D,F}$ comprising a determined number $n_{Df}'$ of the largest eigenvalues of $\Lambda_{D,F}$ and the matrix $C'_{D,F}$ comprising the eigenvectors associated with these $n_{Df}'$ largest eigenvalues, the weighting vectors then being determined using matrices of eigenvectors $C'_{B,T}$, $C'_{B,F}$, $C'_{D,F}$ and of eigenvalues $\Lambda'_{B,T}$, $\Lambda_{B,F}$, $\Lambda'_{D,T}$, $\Lambda_{D,F}$.

The Kronecker product of two matrices A and B, the matrix A having for components ($a_{ij}$), where i is an integer between 1 and m and j is an integer between 1 and n, is the matrix product noted as A⊗B and defined by the following expression:

$$A \otimes B = \begin{pmatrix} a_{11}B & \ldots & \ldots & a_{1n}B \\ \vdots & \ldots & \ldots & \vdots \\ a_{m1}B & \ldots & \ldots & a_{mn}B \end{pmatrix}.$$

This use of the separability of the covariance matrix between the time domain and the frequency domain makes it possible to further reduce the complexity of the calculation of the weighting vectors while still guaranteeing performance very close to that obtained by using the entire covariance matrix.

In addition, the step of determining the signal demodulating step can comprise the sub-steps of:
  calculating a covariance matrix $G_B$ of the propagation channel;
  determining weighting vectors using the covariance matrix $G_B$.

Advantageously, the step of determining the signal demodulating step can further comprise a sub-step of decomposing the covariance matrix $G_B$ into eigenvectors according to the relationship $G_B = C_B \Lambda_B C_B^H$ wherein $C_B$ is a matrix of eigenvectors of the matrix $G_B$ and $\Lambda_B$ is a diagonal matrix comprising eigenvalues associated with the eigenvectors of the matrix $G_B$.

Preferably, the step of determining the signal demodulating step can further comprise a sub-step of extracting a matrix $C'_B$ from the matrix $C_B$ and a matrix $\Lambda'_B$ from the matrix $\Lambda_B$, the matrix $\Lambda'_B$ comprising a determined number $n_B'$ of eigenvalues of $\Lambda_B$ and the matrix $C'_B$ comprising the eigenvectors associated with these $n_B'$ eigenvalues, the weighting vectors then being determined using the matrix of eigenvectors $C'_B$ and of eigenvalues $\Lambda'_B$.

In addition, the covariance matrix $G_B$ can be the Kronecker product of a covariance matrix $G_{B,T}$ in the time domain and of a covariance matrix $G_{B,F}$ in the frequency domain and the step of determining the signal demodulating step comprises the sub-steps of:
  decomposing of the covariance matrices $G_{B,T}$ and $G_{B,F}$ into eigenvectors according to the relationships $G_{B,T} = C_{B,T} \Lambda_{B,T} C_{B,T}^H$ and $G_{B,F} = C_{B,F} \Lambda_{B,F} C_{B,F}^H$, wherein:
  $C_{B,T}$ is a matrix of eigenvectors of the matrix $G_{B,T}$;
  $\Lambda_{B,T}$ is a diagonal matrix comprising eigenvalues associated with the eigenvectors of the matrix $G_{B,T}$;
  $C_{B,F}$ is a matrix of eigenvectors of the matrix $G_{B,F}$; and
  $\Lambda_{B,F}$ is a diagonal matrix comprising eigenvalues associated with the eigenvectors of the matrix $G_{B,F}$;
  extracting of a matrix $C'_{B,T}$ from the matrix $C_{B,T}$ and a matrix $\Lambda'_{B,T}$ from the matrix $\Lambda_{B,T}$, the matrix $\Lambda'_{B,T}$ comprising a determined number $n_{Bt}'$ of the largest eigenvalues of $\Lambda_{B,T}$ and the matrix $C'_{B,T}$ comprising the eigenvectors associated with these $n_{Bt}'$ largest eigenvalues;
  extracting of a matrix $C'_{B,F}$ from the matrix $C_{B,F}$ and a matrix $\Lambda'_{B,F}$ from the matrix $\Lambda_{B,F}$, the matrix $\Lambda'_{B,F}$ comprising a determined number $n_{Bf}'$ of the largest eigenvalues of $\Lambda_{B,F}$ and the matrix $C'_{B,F}$ comprising the eigenvectors associated with these $n_{Bf}'$ largest eigenvalues,
  the weighting vectors then being determined using matrices of eigenvectors $C'_{B,T}$, $C'_{B,F}$ and of eigenvalues $\Lambda'_{B,T}$, $\Lambda'_{B,F}$.

Preferably, the signal emitted is a multi-carrier signal, in particular an OFDM signal.

The invention can also apply to single-carrier systems.

According to another aspect of the invention, a receiving equipment is proposed comprising at least two antennas each receiving a signal transmitted through an associated radio propagation channel, the signals received corresponding to the same emitted signal comprising time and frequency distributed symbol frames in which certain symbols, referred to as driver symbols, are known to the receiver, said method comprising means for:
  noise whitening in order to form two combined signals the noise components of which are separate;
  normalising the noise components of the combined signals in order to form two signals the noise components of which are separate and have equal average standards;
  step of performing signal demodulation with the maximum combination of the signal-to-noise ratio on the two signals, the noise components of which are separate and which have equal average standards;
characterised in that the means of noise whitening for forming the two combined signals comprises means for:
  weighting of each one of the signals received with respective first weighting vectors associated with a respective antenna of the receiver, the signal associated with the first antenna being weighted by a vector $w_1$ and the signal associated with the second antenna being weighted by a vector $w_2$,
  combining weighted received signals in order to form a first combined signal ($c_1$).
  weighting a reference signal comprising said driver symbols with another weighting vector ($W_d$),
  comparing the first combined signal and the weighted reference signal in order to form an error ($\epsilon$), and
  determining weighting vectors ($w_1$, $W_2$ and $W_d$) using the maximum a posteriori criterion by maximising the probability of the occurring of said weighting vectors conditionally with the error obtained,
  weighting of each signal received with second weighting vectors, the signal received on the first antenna being weighted by the conjugate of the complex vector $w_2$ and the signal received on the first antenna being weighted by the opposite of the conjugate of the complex vector $w_1$, combining received signals weighted by the second weighting vectors in order to form a second combined signal ($c_2$).

Advantageously, the receiving equipment according to the invention can furthermore comprise means for determining the respective coefficients ($\alpha_1$ and $\alpha_2$) of the channel seen by the useful signal associated with a respective antenna of the receiver and used in the step of performing signal demodulation with the maximum combination of the signal-to-noise ratio on the two signals, r' and r", obtained at the end of the noise-whitening step, can be determined using the maximum a posteriori criterion by maximising the probability of the occurring of the channel ($\alpha_1$ and $\alpha_2$) conditionally with the error present on the one hand in the signal $c_1$ and on the other hand in the signal $c_2$, by taking into account the propagation channel seen in the signal $c_1$ and in the signal $c_2$.

According to another aspect of the invention, a computer programme is proposed comprising instructions for the implementation of the method according to the invention when the programme is executed by at least one processor.

DESCRIPTION OF THE FIGURES AND EMBODIMENTS

Other advantages and particularities of the invention shall appear when reading the detailed description of implementations and embodiments that are in no way restricted, and the following annexed drawings.

These embodiments being in no way restricted, alternatives of the invention can in particular be considered that comprise only a selection of the characteristics described in what follows separated from the other characteristics described (even if this selection is isolated within a sentence comprising these other characteristics), if this selection of characteristics is sufficient to confer a technical advantage or for differentiating the invention in relation to prior art. This selection comprises at least one more preferably functional characteristic without structural details, or with only one portion of the structural details if this portion only is sufficient to confer a technical advantage or to differentiate the invention in relation to prior art.

Figure 1:
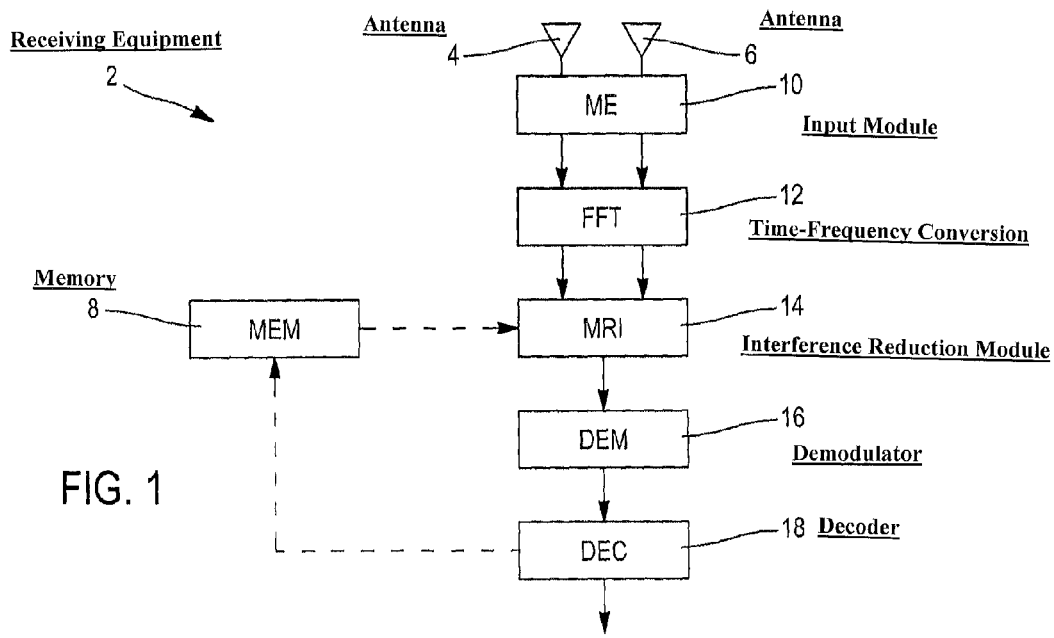
FIG. 1 is a diagram of a receiving equipment according to the invention.

FIG. 1 shows a receiving equipment 2 of an OFDM transmission system, such as for example a base station or a mobile terminal.

The receiver 2 comprises two antennas 4, 6 for the reception of two signals corresponding to the same OFDM signal transmitted from an emitter through two radio propagation channels associated with the antennas 4, 6. The channels associated with the antennas 4, 6 are supposed to respond to identical physical constraints.

The signal OFDM emitted by the emitter is organised into time and frequency distributed frames of symbols among which certain symbols, referred to as driver symbols, are known to the receiver 2 and are stored in a memory 8 of said receiver 2. Each frame comprises as such n symbols with $n_f$ sub-carriers and $n_t$ temps-symbols, n being equal to the product of $n_f$ and of $n_t$.

The receiver 2 comprises an input module 10 comprising amplification, baseband formatting, sampling and guard interval suppression stages.

The receiver 2 further comprises means for the time-frequency conversion 12 of the signals received by the antennas 4, 6 and processed by the input module 10 in order to switch them from the time domain to the frequency domain. These means for time-frequency conversion 12 implement a Fast Fourier Transform (FFT).

The receiver 2 further comprises an interference reduction module 14 making it possible to reduce the level of interference in a useful signal resulting from the combination of the signals received by the two antennas 4, 6. These interferences can be caused, by way of examples, by the presence of scramblers emitting on the same radio channel as the emitter.

The interference reduction module 14 is able to provide data symbols wherein the contribution of the interference is minimised.

A demodulator 16 of the receiver 2 makes it possible to demodulate these data symbols into demodulated bits according to the same modulation technique as that used in the emitter. The demodulator 16 is furthermore arranged in order to determine a similarity of each demodulated bit. The similarity of a bit has a negative or positive soft value, in comparison with a hard value such as the binary value "1" or "0", in order to indicate that the demodulator 16 delivers actual floating values that each have a sign which imposes a later decision, by a decoder 18 of the receiver 2, on the state of the corresponding bit, i.e. a decision on the "hard" value "0" or "1", The decoder 18 as such makes it possible to decode the demodulated bits supplied by the demodulator 16 according to the previously determined similarities. The decoder 18 implements a recoding that corresponds to the encoding used when the signal is emitted, for example a convolutive decoding that corrects the errors using the Viterbi algorithm.

Figure 2:
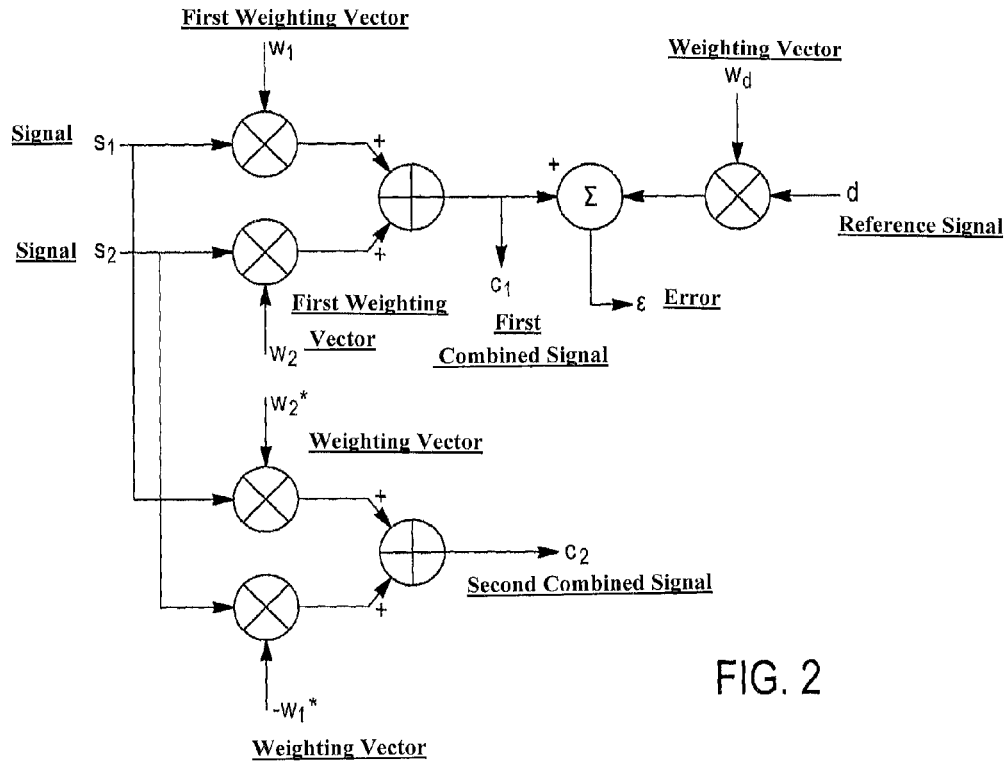
FIG. 2 is a diagram showing the operating principle of the method of demodulation.

FIG. 2 shows the principle of the method for reducing interference used by the interference reduction module 14.

By noting as $s_1$ and $s_2$ the signals received respectively on the antennas 4 and 6, the principle used by this invention consists in applying weightings $w_1$ and $w_2$ respectively to the signals $s_1$ and $s_2$, then in combining the two weighted signals, for example by adding them together, in order to form a signal $c_1$ from which is subtracted an estimate of the emitted signal d weighted by a weighting $w_d$. The resulting difference $\epsilon$ shows a residual error.

The method of the invention uses advantageously the maximum a posteriori approach in order to calculate the most probable weightings knowing this error.

Figure 3:
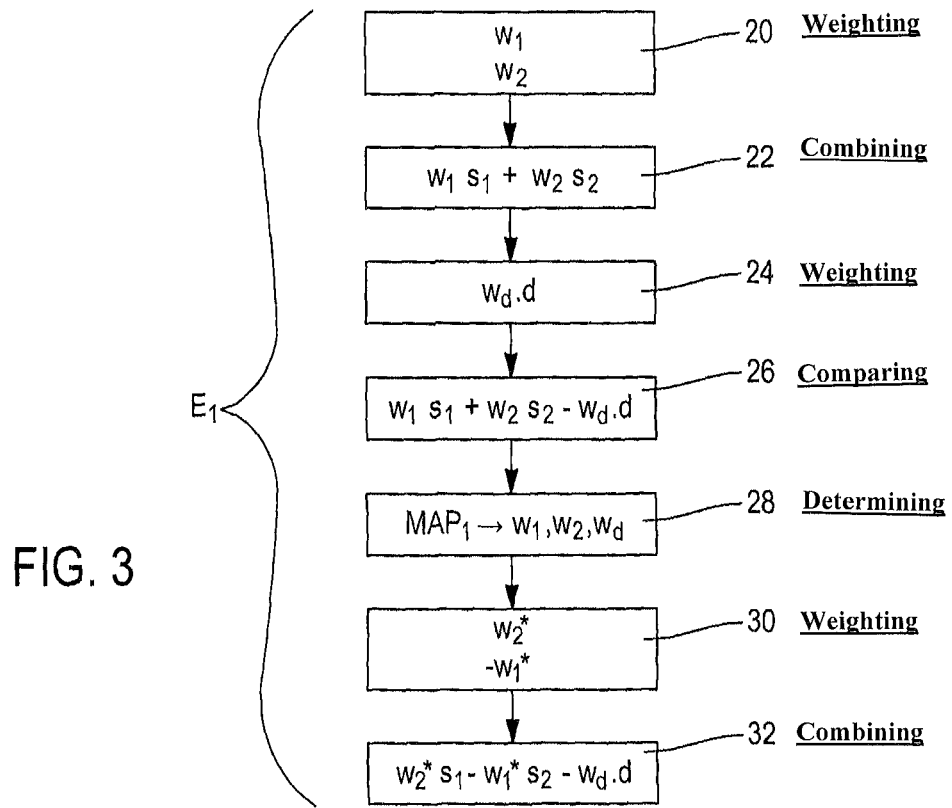
FIG. 3 is a flow chart showing a first part of the operation of the method of demodulation according to the invention.

The steps of this method are described in reference to the flow chart of FIG. 3.

Figure 4:
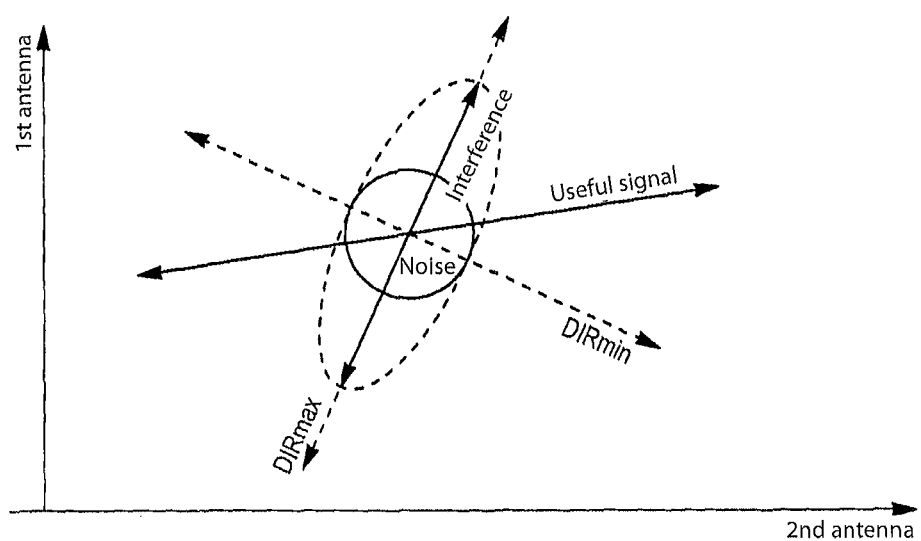
FIG. 4 shows a useful signal in a projection base.

During a first step 20, the interference reduction module 14 weights the signals $s_1$ and $s_2$ with first respective weighting vectors ($w_1$; $w_2$) associated with a respective antenna (4, 6) of the receiver (2). The first weighting vectors ($w_1$; $w_2$) define a minimum direction, noted as DIRmin, for the interference as is shown in FIG. 4. The content of the first weighting vectors ($w_1$; $w_2$) remains to be determined.

In the step 22, the interference reduction module 14 combines, here by adding them together, the weighted signals $s_1$ and $s_2$ in order to form a first combined signal ($c_1$).

As such, we have: $c_1 = w_1 s_1 + w_2 s_2$.

In the step 24, the interference reduction module 14 weights a reference signal d, comprising the driver symbols, with another weighting vector $w_d$ of which the content is to be determined.

The vectors $w_1$, $w_2$ and $w_d$ are column vectors each containing as many lines as the signal received in a frame contains symbols, i.e. n lines.

In the step 26, the interference reduction module 14 determines an error $\epsilon$ that corresponds to the difference between the first combined signal $c_1$ and the weighted reference signal.

As such by noting as w the vector consisting of a concatenation of vectors $w_1$, $w_2$ and $w_d$ and R the matrix comprising the signals received and the reference signal defines according to the expression:

$$R = \begin{bmatrix} \begin{bmatrix} s_{1,0,0} & 0 & \ldots & 0 \\ 0 & s_{1,\ldots} & 0 & \ldots \\ \ldots & 0 & s_{1,\ldots} & 0 \\ 0 & \ldots & 0 & s_{1,n_f,n_i} \end{bmatrix} \begin{bmatrix} s_{2,0,0} & 0 & \ldots & 0 \\ 0 & s_{2,\ldots} & 0 & \ldots \\ \ldots & 0 & s_{2,\ldots} & 0 \\ 0 & \ldots & 0 & s_{2,n_f,n_i} \end{bmatrix} \\ \begin{bmatrix} -d_{0,0} & 0 & \ldots & 0 \\ 0 & -d & 0 & \ldots \\ \ldots & 0 & -d & 0 \\ 0 & \ldots & 0 & -d_{n_f,n_i} \end{bmatrix} \end{bmatrix}$$

the error $\epsilon$ is a vector expressed by $\epsilon = R \cdot w$.

In the step 28, the interference reduction module 14 calculates the vector $w_1$, $w_2$ and $w_d$ by using the MAP approach.

This approach consists in maximising the probability of the occurring of the weighting vector w. This probability if conditional to the observation of the error ε.

By using the Bayes formula, this probability is equal to the probability that the error ε is observed conditionally to the probability that the weighting is equal to the vector w, this probability being multiplied by the probability that the weighting vector w is carried out. This is expressed by the following relationship:

$$P(W) = f(w/\varepsilon) \propto f(\varepsilon/w) \cdot f(w),$$

wherein P and f indicate probabilities and the symbol ∝ indicates the "equivalent" relationship.

However, the weighting vectors $w_1$, $w_2$ and $w_d$ are linked to the propagation channel. This channel is conditioned by constraints relating to its maximum time spread, due to reflections on distant obstacles, and to its maximum frequency spread, due to the speed of the receiving equipment and to the carrier frequency, i.e. the Doppler spread.

On the one hand, in the frequency domain, the frequency spread of the channel, called the Doppler spread, due to the reflections on near obstacles is limited. This spread is between $-F_D$ and $+F_D$, wherein $F_D$ is the maximum Doppler frequency given by the relationship $$F_D = \frac{v}{c} \cdot F_p,$$

wherein v is the speed of the receiver 2, c is the speed of light, and $F_p$ is the carrier frequency. The components of the frequency spectrum of the propagation channel according to the frequency axis are therefore between these limits $-F_D$ and $+F_D$.

On the other hand, the time spread of the channel, due to the reflections on the distant obstacles, is limited. This time spread depends on the frequency band used and of the environment. By way of examples, at a carrier frequency of 400 MHz, in an urban environment the time spread is about 5 μs while in a mountainous environment, this spread is about 15 μs. The components of the time response of the channel are therefore between fixed limits for given environmental conditions.

The limits of the frequency spectrum and of the time response of the channel are known to the receiver 2 and are stored in the memory 8.

These characteristics of the propagation channel are represented by a matrix referred to as the global covariance matrix G.

Due to the constraints expressed in the global covariance matrix G, the probability of the occurrence of the weighting vector w is given by the expression:

$$f(w) = \beta \times e^{-1/2 w^H G^{-1} w}$$

wherein β is a constant and the notation $X^H$ indicates that it is a conjugate and transposed matrix X.

Furthermore, under the hypothesis that the noise component of the channel id of the Gaussian type, the conditional probability of observing the error ε is given by the expression:

$$f(\varepsilon/w) = \alpha \times e^{-|R \cdot w|^2/(2\sigma^2)}$$

wherein α is a constant and $\sigma^2$ represents the variance of the noise component in the signal corresponding to the signals received on the various weighted and combined antennas.

As such the probability of the occurring, expressing the MAP criterion, of the weighting vector w is given by the following expression [1]:

$$P(w) = \alpha \times e^{-\frac{\|R \cdot w\|^2}{(2 \cdot \sigma^2)}} \times \beta \times e^{-1/2 \cdot w^H G^{-1} w}. \quad [1]$$

Furthermore, the variance, or power, $\sigma^2$ is equal to:

$$\sigma^2 = \sigma_1^2 \|w_1\|^2 + \sigma_2^2 \|w_2\|^2,$$

wherein $\sigma_1^2$ is the variance of the noise component on the first antenna 4 and $\sigma_2^2$ is the variance of the noise component on the second antenna 6.

Assuming that the power of the noise component is the same on each one of the two antennas, i.e. that $\sigma_1^2 = \sigma_2^2$ the variance of the total noise component is then equal to $$\sigma^2 = \sigma_1^2 (\|w_1\|^2 + \|w_2\|^2)(.$$

By taking the opposite of the logarithm of the expression [1], the following expression [2] is obtained:

$$L(P(w)) = \frac{\|R \cdot w\|^2}{\sigma_1^2(\|w_1\|^2 + \|w_2\|^2)} + w^H G^{-1} w + cst, \quad [2]$$

wherein cst designates a constant value.

The interference reduction module 14 attempts to minimise this logarithm L(P(w)).

Moreover, the covariance matrix G is a diagonal matrix by blocks constituted by the concatenation of covariance matrices corresponding to each one of the weighting vectors $w_1$, $w_2$ and $w_d$.

The covariance matrix of $w_1$ is the same as that of $w_2$ given that the two weighting vectors $w_1$ and $w_2$ are both homogeneous with a propagation channel, on the case of two receiving antennas. This covariance matrix is noted as $G_B$ and shows the time and frequency constraints relative to the propagation channel.

The weighting vector $w_d$ is homogeneous with the product, symbol by symbol, of two propagation channels, on the case of two receiving antennas. The corresponding covariance matrix $G_D$ shows the time and frequency constraints relative to such a product.

The covariance matrix G can therefore be written as:

$$G = \begin{pmatrix} G_B & 0 & 0 \\ 0 & G_B & 0 \\ 0 & 0 & G_D \end{pmatrix}.$$

Furthermore, the following constraint is imposed:

$$k^2 = \|w_1\|^2 + \|w_2\|^2 = cst_2.$$

This constraint does not limit the solutions to the minimisation problem of the expression [2]. Indeed, regardless of the value of $k^2$, the solution w does not change given that changing this constant would only multiply the solution by a scalar constant.

In what follows, $k^2$ is set to 2. This makes it possible to consider that the weightings $w_1$ and $w_2$ are each of unitary power. Then the matrix $G_B$ is the normalised covariance matrix, i.e. obtained with a unitary average power of the channel, and the matrix $G_D$ is the covariance matrix corresponding to the product, symbol by symbol, of two channels of unitary power. Consequently, $\sigma_1$ shows the inverse' of the signal-to-noise ratio observed on any of the antennas.

It is possible to set a target value for the signal-to-noise ratio, with this value not changing regardless of the effective value of the puissance of the noise component and of the useful signal power. Other solutions are possible as, for example, estimating the signal-to-noise ratio as the information received is received and demodulated, for example on the driver symbols which are known to the emitter and to the receiver. In this case it is possible to dynamically adapt the signal-to-noise ratio in the process of estimating the channel.

The expression [2] can then be written as:

$$L(P(w)) = \frac{\|R \cdot w\|^2}{2 \cdot \sigma_1^2} + w^H G^{-1} w + cst.$$

The minimisation problem of the step 28 is as such an optimisation problem with constraint, which is resolved with the Lagrange multipliers according to the following relationship:

$$\nabla_w (L(P(w))) = \left( \frac{R^H R}{2 \cdot \sigma_1^2} + G^{-1} \right) w - \mu N^H N w$$

wherein $\nabla_w$ designates the gradient in relation to weighting vector w and the matrix N is the identity matrix for the two signals received at the antennas 4, 6 and the zero matrix for the reference signal.

In other terms, the matrix N can be written as:

$$N = \begin{pmatrix} 1 & 0 & \cdots & \cdots & \cdots & \cdots & \cdots & \cdots & 0 \\ 0 & \ddots & \ddots & & & & & & \vdots \\ \vdots & \ddots & 1 & \ddots & & & & & \vdots \\ \vdots & & \ddots & 1 & \ddots & & & & \vdots \\ \vdots & & & \ddots & \ddots & \ddots & & & \vdots \\ \vdots & & & & \ddots & 1 & \ddots & & \vdots \\ \vdots & & & & & \ddots & 0 & \ddots & \vdots \\ \vdots & & & & & & \ddots & \ddots & 0 \\ 0 & \cdots & \cdots & \cdots & \cdots & \cdots & \cdots & 0 & 0 \end{pmatrix}.$$

The minimisation of the gradient then gives the following expression [3]:

$$\nabla_w(L(P(w))) = 0 \Rightarrow \left( \frac{R^H R}{2 \cdot \sigma_1^2} + H \right) w = \mu N^H N w, \quad [3]$$

wherein the matrix H is equal to the inverse of the covariance matrix G.

The weighting vector w solution of the minimisation problem is as such a generalised eigenvector both of the term $$\left( \frac{R^H R}{2 \cdot \sigma_1^2} + H \right)$$

and of the term $N^H N$ and $\mu$ is the associated generalised eigenvalue.

Furthermore, the solution must satisfy the relationship $L(P(w)) = \mu + cst$.

As such, the weighting vector w minimising $L(P(w))$ is the generalised eigenvector corresponding to the smallest generalised eigenvalue $\mu$.

According to a preferred embodiment, in order to reduce the complexity of the calculations, the covariance matrices $G_B$ and $G_D$ are decomposed in the step 28 into eigenvectors and eigenvalues in the following way:

$$\begin{cases} G = \begin{pmatrix} G_B & 0 & 0 \\ 0 & G_B & 0 \\ 0 & 0 & G_D \end{pmatrix} \\ \begin{cases} G_B = C_B, \Lambda_B, C_B^H \\ G_D = C_D, \Lambda_D, C_D^H \end{cases} \Rightarrow \begin{cases} G_B^{-1} = C_B, \Lambda_B^{-1}, C_B^H \\ G_D^{-1} = C_D, \Lambda_D^{-1}, C_D^H \end{cases} \end{cases},$$

where the matrices $C_B$ and $C_D$ are matrices of eigenvectors of the matrices $G_B$ and $G_D$ respectively and the matrices $\Lambda_B$ and $\Lambda_D$ are the diagonal matrices of corresponding eigenvalues respectively.

The covariance matrix G can as such be written $G = C \Lambda C^H$ wherein C is a matrix of eigenvectors of the matrix G and $\Lambda$ is a diagonal matrix comprising eigenvalues associated with the eigenvectors of the matrix G.

As such, the inverse matrix of the covariance matrix G is equal to:

$$\begin{cases} G^{-1} = \begin{pmatrix} C_B, \Lambda_B^{-1}, C_B^H & 0 & 0 \\ 0 & C_B, \Lambda_B^{-1}, C_B^H & 0 \\ 0 & 0 & C_D, \Lambda_D^{-1}, C_D^H \end{pmatrix}. \\ soit \\ G^{-1} = C, \Lambda^{-1}, C^H \end{cases}$$

According to an embodiment, the complexity of the calculation is further reduced by retained only certain eingenvalues of the covariance matrix G as well as the corresponding eigenvalues. In this case, a matrix C' is extracted from the matrix C and a matrix $\Lambda'$ is extracted from the matrix $\Lambda$, the matrix $\Lambda'$ comprising a determined number n' of eigenvalues of $\Lambda$ and the matrix C' comprising the eigenvectors associated with these n' eigenvalues. The weighting vector w is then determined using matrices of eigenvectors C' and of eigenvalues $\Lambda'$.

In a preferred embodiment, the covariance matrix G is a diagonal matrix par bloc, constituted of the matrices $G_B$, $G_B$ and $G_D$, and for which each one of the matrices $G_B$ and $G_D$ is the Kronecker product of a covariance matrix $G_{B,T}$, respectively $G_{D,T}$, in the time domain and of a covariance matrix $G_{B,F}$, respectively $G_{D,F}$, in the frequency domain and the step of determining comprises the sub-steps of:

decomposing of the covariance matrices $G_{B,T}$ and $G_{B,F}$ into eigenvectors according to the relationships $G_{B,T} = C_{B,T} \Lambda_{B,T} C_{B,T}^H$ and $G_{B,F} = C_{B,F} \Lambda_{B,F} C_{B,F}^H$, wherein:

$C_{B,T}$ is a matrix of eigenvectors of the matrix $G_{B,T}$;

$\Lambda_{B,T}$ is a diagonal matrix comprising eigenvalues associated with the eigenvectors of the matrix $G_{B,T}$;

$C_{B,F}$ is a matrix of eigenvectors of the matrix $G_{B,F}$; and $\Lambda_{B,F}$ is a diagonal matrix comprising eigenvalues associated with the eigenvectors of the matrix $G_{B,F}$;

extracting of a matrix $C'_{B,T}$ from the matrix $C_{B,T}$ and a matrix $\Lambda'V_{B,T}$ from the matrix $\Lambda_{B,T}$, the matrix $\Lambda'_{B,T}$ comprising a determined number $n_{Bt}'$ of the largest eigenvalues of $\Lambda_{B,T}$ and the matrix $C'_{B,T}$ comprising the eigenvectors associated with these $n_{Bt}'$ largest eigenvalues; and extracting of a matrix $C'_{B,F}$ from the matrix $C_{B,F}$ and a matrix $\Lambda'_{B,F}$ from the matrix $\Lambda_{B,F}$, the matrix $\Lambda'_{B,F}$ comprising a determined number $n_{Bf}'$ of the largest eigenvalues of $\Lambda_{B,F}$ and the matrix $C'_{B,F}$ comprising the eigenvectors associated with these $n_{Bf}'$ largest eigenvalues, decomposing of covariance matrices $G_{D,T}$ and $G_{D,F}$ into eigenvectors according to the relationships $G_{D,T} = C_{D,T}\Lambda_{D,T}C_{D,T}^H$ and $G_{D,F}=C_{D,F}\Lambda_{D,F}C_{D,F}^H$, wherein:

$C_{D,T}$ is a matrix of eigenvectors of the matrix $G_{D,T}$;

$\Lambda_{D,T}$ is a diagonal matrix comprising eigenvalues associated with the eigenvectors of the matrix $G_{D,T}$;

$C_{D,F}$ is a matrix of eigenvectors of the matrix $G_{D,F}$; and $\Lambda_{D,F}$ is a diagonal matrix comprising eigenvalues associated with the eigenvectors of the matrix $G_{D,F}$;

extracting of a matrix $C'_{D,T}$ from the matrix $C_{D,T}$ and a matrix $\Lambda'_{D,T}$ from the matrix $\Lambda_{D,T}$, the matrix $\Lambda'_{D,T}$ comprising a determined number $n_{Dt}'$ of the largest eigenvalues of $\Lambda_{D,T}$ and the matrix $C'_{D,T}$ comprising the eigenvectors associated with these $n_{Dt}'$ largest eigenvalues; and extracting of a matrix $C'_{D,F}$ from the matrix $C_{D,F}$ and a matrix $\Lambda'_{D,F}$ from the matrix $\Lambda_{D,F}$, the matrix $\Lambda'_{D,F}$ comprising a determined number $n_{Df}'$ of the largest eigenvalues of $\Lambda_{D,F}$ and the matrix $C'_{D,F}$ comprising the eigenvectors associated with these $n_{Df}'$ largest eigenvalues.

The weighting vector w is then determined using matrices of eigenvectors $C'_{B,T}$, $C'_{B,F}$, $C'_{D,T}$, $C'_{D,F}$ and of eigenvalues $\Lambda'_{B,T}$, $\Lambda'_{B,F}$, $\Lambda'_{D,T}$, $\Lambda'_{D,F}$.

Returning to the expression [3] and by using the decomposing into eigenvectors and into eingenvalues of the covariance matrix, the following is obtained:

$$\left(\frac{R^H R}{\sigma^2} + H\right)w = \mu N^H Nw \begin{cases} \Leftrightarrow \left(\frac{R^H R}{2, \sigma^2} + C, \Lambda^{-1}, C^H\right)w = \mu N^H Nw \\ \Leftrightarrow \left(\frac{C^H R^H RC}{2, \sigma^2} + \Lambda^{-1}\right)y = \mu C^H N^H NCy \end{cases}$$

wherein $y=C^H w$ wherein y is the concatenation of vectors $y_1$, $y_2$, and $y_d$:

$$y = \begin{bmatrix} y_1 \\ y_2 \\ y_d \end{bmatrix} = C^H w = \begin{bmatrix} C_B^H & 0 & 0 \\ 0 & C_B^H & 0 \\ 0 & 0 & C_D^H \end{bmatrix} \cdot \begin{bmatrix} w_1 \\ w_2 \\ w_d \end{bmatrix}$$

The problem can be further simplified by separating the equations in $y_1$ and $y_2$ from that in $y_d$. This can be done by multiplying the equation on the left by M=I−N, respectively the equation on the left by N.

$$\left(\frac{1}{2\sigma^2} MC^H R^H RC + M\Lambda^{-1}\right)\bar{y} = \mu MC^H NC\bar{y} = 0$$

$$\left(\frac{1}{2\sigma^2} NC^H R^H RC + N\Lambda^{-1}\right)\bar{y} = \mu NC^H NC\bar{y} = \mu C^H NC\bar{y}$$

The solution for the first equation in $y_d$ gives:

$$(C_D^H d^H dC_D + 2\sigma^2 \Lambda_D^{-1})y_d = [\, C_D^H d^H s_1 C_B \quad C_D^H d^H s_2 C_B \,]\bar{y}_{12},$$

$$\bar{y}_{12} \equiv \begin{bmatrix} y_1 \\ y_2 \end{bmatrix}$$

Where $\left(\frac{1}{2\sigma^2}\begin{bmatrix} C_B^H s_1^H s_1 C_B & C_B^H s_1^H s_2 C_B \\ C_B^H s_2^H s_1 C_B & C_B^H s_2^H s_2 C_B \end{bmatrix} -\right.$ $$\frac{1}{2\sigma^2}\begin{bmatrix} C_B^H s_1^H dC_D \\ C_B^H s_2^H dC_D \end{bmatrix}(C_D^H d^H dC_D + 2\sigma^2 \Lambda_D^{-1})^{-1}$$

$$\left.[\, C_B^H d^H s_1 C_B \quad C_B^H d^H s_2 C_B \,] + \begin{bmatrix} \Lambda_B & 0 \\ 0 & \Lambda_B \end{bmatrix}^{-1}\right)\bar{y}_{12} = \mu \bar{y}_{12}$$

After having determined the vector y using the preceding expression, the interference reduction module 14 calculates the weighting vector w according to the relationship:

$w=C \cdot y$.

In the step 30, the interference reduction module 14 weights the signals received $s_1$ and $s_2$ respectively by weighting vectors $w^*_2$ and $-w^*_1$. As such the vector $(w_1, w_2)$, referred to as the first weighting vector, formed by the first weighting vectors $(w_1, w_2)$ is orthogonal (i.e. the hermitian product is zero) on each symbol to the vector $(w^*_2, -w^*_1)$, referred to as the second weighting vector, formed by the second weighting vectors $(w^*_2, -w^*_1)$. The second weighting vectors $(w^*_2, -w^*_1)$ define a maximum direction, noted as DIRmax, for the interference as is shown in FIG. 4.

The notation $X^*$ indicates that it is a conjugate matrix X.

In the step 32, the interference reduction module 14 combines, here by adding them together, the weighted signals $c_1$ and $c_2$ by the second weighting vectors $(w^*_2, -w^*_1)$ in order to form a combined signal $c_2$.

As such, we have: $c_2 = w^*_2 s_1 - w^*_1 s_2$.

Two signals $c_1$ and $c_2$ are thus obtained of which the noise components are not correlated as they are orthogonal.

Then, a step of normalising (not shown) of the noise components of the combined signals $(c_1; c_2)$ in order to form two signals (r'; r'') the noise components of which are separate and have equal average standards is carried out.

Figure 5:
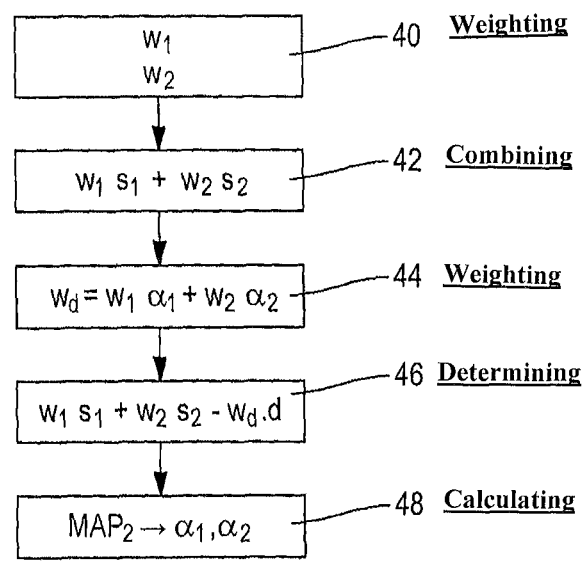
FIG. 5 is a flow chart showing a second part of the operation of the method of demodulation according to the invention.

The following steps of the method are described in reference to the flow chart of FIG. 5.

On note $(\alpha_1, \alpha_2)$ the respective coefficients of the channel seen by the useful signal associated with a respective antenna (4, 6) of the receiver (2).

The vectors $\alpha_1$, $\alpha_2$ are calculated by using the MAP approach.

During a first step 40, the interference reduction module 14 weights the signals received $s_1$ and $s_2$ respectively by weighting vectors $w_1$ and $w_2$ determined previously.

In the step 42, the interference reduction module 14 combines, here by adding them together, the weighted signals $s_1$ and $s_2$ in order to form a combined signal $c_1$.

As such, the following signal is obtained: $c_1 = w_1 s_1 + w_2 s_2$.

In the step 44, the interference reduction module 14 weights a reference signal d, comprising the driver symbols, with another weighting vector $w_d$.

It is observed that $w_d$ can be obtained by combining a weighting of the first weighting vector ($w_1$, $w_2$) determined during the step of determining (28) of the step of whitening E1 by the channel vector ($\alpha_1$, $\alpha_2$). As such, ideally: $w_d = w_1\alpha_1 + w_2\alpha_2$.

The vectors $\alpha_1$, $\alpha_2$ are column vectors each containing as many lines as the signal received in a frame contains symbols, i.e. n lines.

In the step 46, the interference reduction module 14 determines an error $\epsilon$ that corresponds to the difference between the combined signal obtained $c_1 = w_1 s_1 + w_2 s_2$ and the weighted reference signal d of $w_d = w_1\alpha_1 + w_2\alpha_2$.

As such by noting as $\alpha$ the vector consisting of a concatenation of vectors $w_1$, $w_2$ and $w_d = w_1\alpha_1 + w_2\alpha_2$ and the matrix comprising the signals received as defined hereinabove, the error $\epsilon$ still exists which is the vector expressed by $\epsilon = R\alpha$.

In the step 48, the interference reduction module 14 calculates the vector $\alpha_1$, $\alpha_2$ by using the MAP approach.

This approach consists in maximising the probability of the occurring of the weighting vector $\alpha$. This probability is conditional to the observation of the error $\epsilon$.

By using the Bayes formula, this probability is equal to the probability that the error $\epsilon$ is observed conditionally to the probability that the weighting is equal to the vector $\alpha$, this probability being multiplied by the probability that the weighting vector $\alpha$ is carried out. This is expressed by the following relationship:

$$P(\alpha) = f(\alpha/\epsilon) \propto f(\epsilon/\alpha) \cdot f(\alpha),$$

wherein P and f indicate probabilities and the symbol $\propto$ indicates the "equivalent to" relationship.

As previously, the limits of the frequency spectrum and of the time response of the channel are known to the receiver 2 and are stored in the memory 8.

These characteristics of the propagation channel are represented by a matrix referred to as the global covariance matrix $G_2$.

$$\begin{cases} G_2 = \begin{pmatrix} G_B & 0 \\ 0 & G_B \end{pmatrix} \\ G_B = C_B, \Lambda_B, C_B^H \Rightarrow G_B^{-1} = C_B, \Lambda_B^{-1}, C_B^H \end{cases}$$

Due to the constraints expressed in the global covariance matrix $G_2$, the probability of the occurrence of the weighting vector $\alpha$ is given by the expression:

$$f(\alpha) = \beta' \times e^{-1/2 \alpha^H G_2^{-1} \alpha}$$

wherein $\beta'$ is a constant.

Furthermore, under the hypothesis that the noise component of the channel id of the Gaussian type, the conditional probability of observing the error $\epsilon$ is given by the expression:

$$f(\alpha/w) = \alpha' \times e^{-\|R \cdot \alpha\|^2 / (2, \sigma^{-2})}$$

wherein $\alpha'$ is a constant and $\alpha'^2$ represents the variance of the noise component in the signal corresponding to the signals received on the various weighted and combined antennas.

As such the probability of the occurring, expressing the MAP criterion, of the weighting vector $\alpha$ is given by the following expression [1]:

$$P(\alpha) = \alpha' e^{-\frac{\|R \cdot \alpha\|^2}{(2,\sigma^2)}} \times \beta' \times e^{-1/2 \alpha^H G_2^{-1} \alpha} \qquad [4]$$

By taking the opposite of the logarithm of the expression [4] the following expression [5] is obtained:

$$L(P(\alpha)) = \frac{\|R, \alpha\|^2}{\sigma^2} + \alpha^H G_2^{-1} \alpha + cst' \qquad [5]$$

wherein cst' designates a constant value.

The interference reduction module 14 attempts to minimise this logarithm $L(P(\alpha))$, which reverts to minimising:

$$\frac{\left\| [w_1 \ w_2] \begin{bmatrix} s_1 \\ s_2 \end{bmatrix} d - [w_1 \ w_2] \cdot \begin{bmatrix} \alpha_1 \\ \alpha_2 \end{bmatrix} \right\|^2}{\|b_{min}\|^2} +$$

$$\frac{\left\| [w_2^* \ -w_1^*] \begin{bmatrix} \vec{s_1} \\ \vec{s_2} \end{bmatrix} - d \cdot [w_2^* \ -w_1^*] \begin{bmatrix} \alpha_1 \\ \alpha_2 \end{bmatrix} \right\|^2}{\|b_{max}\|^2} +$$

$$[\alpha_1^* \ \alpha_2^*] \begin{bmatrix} G_B^{-1} & 0 \\ 0 & G_B^{-1} \end{bmatrix} \cdot \begin{bmatrix} \alpha_1 \\ \alpha_2 \end{bmatrix}$$

Avec $b_{min}$ the noise component plus interference along the axis DIRmin and $b_{max}$ the noise component plus interference along the axis DIRmax.

The resolution of this equation makes it possible to find the coefficients $\alpha_1$, $\alpha_2$.

In order to minimise the preceding expression, its gradient will simply be cancelled.

The following relationship is thus obtained which will make it possible to find $\alpha_1$ and $\alpha_2$:

$$-\left(\frac{1}{\|b_{min}\|^2} \cdot \begin{bmatrix} w_1^* \\ w_2^* \end{bmatrix} \cdot d^H \cdot [w_1 \ w_2] + \frac{1}{\|b_{max}\|^2} \cdot \begin{bmatrix} w_2 \\ -w_1 \end{bmatrix} \cdot d^H \cdot [w_2^* \ -w_1^*]\right)$$

$$\left(\begin{bmatrix} s_1 \\ s_2 \end{bmatrix} - d \cdot \begin{bmatrix} \alpha_1 \\ \alpha_2 \end{bmatrix}\right) + \begin{bmatrix} G_B^{-1} & 0 \\ 0 & G_B^{-1} \end{bmatrix} \cdot \begin{bmatrix} \alpha_1 \\ \alpha_2 \end{bmatrix} = 0$$

For this, in the same way as hereinabove, the following is posited:

$$z = \begin{bmatrix} z_1 \\ z_2 \end{bmatrix} = C_2^H \cdot \begin{bmatrix} \alpha_1 \\ \alpha_2 \end{bmatrix} = \begin{bmatrix} C_B^H & 0 \\ 0 & C_B^H \end{bmatrix} \cdot \begin{bmatrix} \alpha_1 \\ \alpha_2 \end{bmatrix}$$

As such, the equation becomes:

$$\left(\frac{1}{\|b_{min}\|^2} \cdot \begin{bmatrix} w_1^* \\ w_2^* \end{bmatrix} \cdot d^H \cdot [w_1 \ w_2] + \frac{1}{\|b_{max}\|^2} \cdot \begin{bmatrix} w_2 \\ -w_1 \end{bmatrix} \cdot d^H \cdot [w_2^* \ -w_1^*]\right)$$

-continued $$\left(\begin{bmatrix} s_1 \\ s_2 \end{bmatrix} - d \cdot \begin{bmatrix} C_B & 0 \\ 0 & C_B \end{bmatrix} \cdot \begin{bmatrix} z_1 \\ z_2 \end{bmatrix}\right) = \begin{bmatrix} C_B \Lambda_B^{-1} & 0 \\ 0 & C_B \Lambda_B^{-1} \end{bmatrix} \cdot \begin{bmatrix} z_1 \\ z_2 \end{bmatrix}$$

with:

$$\begin{bmatrix} \alpha_1 \\ \alpha_2 \end{bmatrix} = \begin{bmatrix} C_B & 0 \\ 0 & C_B \end{bmatrix} \cdot \begin{bmatrix} z_1 \\ z_2 \end{bmatrix}$$

This therefore makes it possible to obtain $\alpha_1$ and $\alpha_2$.

All of the preceding remarks on the time/frequency separability of the covariance matrices $G_B$, and therefore $C_B$, as well as the reducing of these matrices with C' can as such be applied.

Only the matrices $G_B$ and $C_B$ appear in the calculations. The matrices $G_D$ and $C_D$ no longer appear in the calculations.

As previously, the matrices $G_{B,T}$, $G_{B,F}$, then $G'_{B,T} G'_{B,F}$, are introduced again. All of the methods for resolving the system presented in the first resolution of Maximum A Posteriori can be applied in the same way (without the matrix $G_D$).

According to an embodiment, the complexity of the calculation is further reduced by retained only certain eingenvalues of the covariance matrix $G_2$ as well as the corresponding eigenvalues. In this case, a matrix C' is extracted from the matrix $C_2$ and a matrix $\Lambda'$ is extracted from the matrix $\Lambda_2$, the matrix $\Lambda'$ comprising a determined number n' of eigenvalues of $\Lambda_2$ and the matrix C' comprising the eigenvectors associated with these n' eigenvalues. The weighting vector $\alpha$ is then determined using matrices of eigenvectors C' and of eigenvalues $\Lambda'$.

In a preferred embodiment, the covariance matrix $G_2$ is a diagonal matrix par bloc, constituted of the matrices $G_B$, $G_B$, and for which each one of the matrices $G_B$ is the Kronecker product of a covariance matrix $G_{B,T}$ in the time domain and of a covariance matrix $G_{B,F}$ in the frequency domain and the step of determining comprises the sub-steps of:

decomposing of the covariance matrices $G_{B,T}$ and $G_{B,F}$ into eigenvectors according to the relationships $G_{B,T}= C_{B,T} \Lambda_{B,T} C_{B,T}^H$ and $G_{D,F}= C_{B,F} \Lambda_{B,F} C_{B,F}^H$, wherein:

$C_{B,T}$ is a matrix of eigenvectors of the matrix $G_{B,T}$;
$\Lambda_{B,T}$ is a diagonal matrix comprising eigenvalues associated with the eigenvectors of the matrix $G_{B,T}$;
$C_{B,F}$ is a matrix of eigenvectors of the matrix $G_{B,F}$; and
$\Lambda_{B,F}$ is a diagonal matrix comprising eigenvalues associated with the eigenvectors of the matrix $G_{B,T}$;
extracting of a matrix $C'_{B,T}$ from the matrix $C_{B,T}$ and a matrix $\Lambda'_{B,T}$ from the matrix $\Lambda_{B,T}$, the matrix $\Lambda'_{B,T}$ comprising a determined number $n_{Bt}'$ of the largest eigenvalues of $\Lambda_{B,T}$ and the matrix $C'_{B,T}$ comprising the eigenvectors associated with these $n_{Bt}'$ largest eigenvalues; and
extracting of a matrix $C'_{B,F}$ from the matrix $C_{B,F}$ and a matrix $\Lambda'_{B,F}$ from the matrix $\Lambda_{B,F}$, the matrix $\Lambda'_{B,F}$ comprising a determined number $n_{Bf}'$ of the largest eigenvalues of $\Lambda_{B,F}$ and the matrix $C'_{B,F}$ comprising the eigenvectors associated with these $n_{Bf}'$ largest eigenvalues, The weighting vector $\alpha$ is then determined using matrices of eigenvectors $C'_{B,T}$, $C'_{B,F}$, and of eigenvalues $\Lambda_{B,T}$ and $\Lambda_{B,F}$.

The coefficients $\alpha_1, \alpha_2$ are then used in the step of performing signal demodulation with the maximum combination of the signal-to-noise ratio on the two signals (r', r'').

Of course, the invention is not limited to the examples that have just been described and many arrangements can be made to these examples without leaving the scope of the invention.

In particular, the approach was described for two antennas but it can be generalised to a greater number of antennas.

The invention claimed is:

1. A method for demodulating a signal in a receiver comprising at least two antennas each receiving a signal transmitted through an associated radio propagation channel, the signals received corresponding to a same emitted signal comprising time and frequency distributed symbol frames in which driver symbols are known to the receiver, said method comprising:

noise whitening to form two combined signals that have noise components which are separate;
normalising the noise components of the two combined signals in order to form two signals (r', r'') that have noise components which are separate and have equal average standards;
performing signal demodulation with a maximum combination of a signal-to-noise ratio on the two signals (r', r''), the noise components of which are separate and which have equal average standards,
wherein the noise whitening to form the two combined signals comprises:
weighting each of the signals received with respective first weighting vectors associated with a respective antenna of the receiver, the signal associated with the first antenna being weighted by a weighting vector $w_1$ and the signal associated with the second antenna being weighted by a weighting vector $w_2$,
combining the weighted received signals in order to form a first combined signal ($c_1$),
weighting a reference signal comprising said driver symbols with another weighting vector,
comparing the first combined signal and the weighted reference signal in order to form an error,
determining the weighting vectors ($w_1$; $w_2$) using a maximum a posteriori criterion by maximising a probability of occurring of said weighting vectors ($w_1$; $w_2$) conditionally with the error obtained,
weighting each signal received with: second weighting vectors ($w^*_2$, $-w^*_1$), the signal received on the first antenna being weighted by a conjugate of a complex vector $w_2$ and the signal received on the second antenna being weighted by an opposite of the conjugate of a complex vector $w_1$,
combining signals received weighted by the second weighting vectors in order to form a second combined signal ($c_2$),
wherein respective coefficients of the propagation channel corresponding to a useful signal associated with the respective antenna of the receiver and used in performing signal demodulation with the maximum combination of the signal-to-noise ratio on the two signals (r', r''), obtained at an end of the noise-whitening step, are determined using the maximum a posteriori criterion by maximising the probability of the occurring of the channel conditionally with the error present on the one hand in the first combined signal ($c_1$) and on the other hand in the second combined signal ($c_2$), by taking into account the propagation channel seen in the first combined signal ($c_1$) and in the second combined signal ($c_2$).

2. The method according to claim 1, wherein the determining comprises:
calculating a covariance matrix $G_B$ of the propagation channel;
calculating a covariance matrix $G_D$ of a product symbol by symbol of two propagation channels; and
determining weighting vectors using covariance matrices $G_B$ and $G_D$.

3. The method according to claim 2, wherein the determining further comprises decomposing the covariance matrix $G_B$ into eigenvectors according to a relationship $G_B=C_B\Lambda_B C_B^H$ wherein $C_B$ is a matrix of eigenvectors of the matrix $G_B$ and $\Lambda_B$ is a diagonal matrix comprising eigenvalues associated with the eigenvectors of the matrix $G_B$ and decomposing the covariance matrix $G_D$ into eigenvectors according to a relationship $G_D=C_D\Lambda_D C_D^H$ wherein $C_D$ is a matrix of eigenvectors of the matrix $G_D$ and $\Lambda_D$ is a diagonal matrix comprising eigenvalues associated with the eigenvectors of the matrix $G_D$.

4. The method according to claim 3, wherein the determining further comprises extracting a matrix $C'_B$ from the matrix $C_B$ and a matrix $\Lambda'_B$ from the matrix $\Lambda_B$, the matrix $\Lambda'_B$ comprising a determined number $n_B'$ of eigenvalues of $\Lambda_B$ and the matrix $C'_B$ comprising the eigenvectors associated with these $n_B'$ eigenvalues, and extracting a matrix $C'_D$ from the matrix $C_D$ and a matrix $\Lambda'_D$ from the matrix $\Lambda_D$, the matrix $\Lambda'_D$ comprising a determined number $n_D'$ of eigenvalues of $\Lambda_D$ and the matrix $C'_D$ comprising the eigenvectors associated with the $n_D'$ eigenvalues, the weighting vectors then being determined using matrices of eigenvectors $C'_B$ and $C'_D$ and of eigenvalues $\Lambda'_B$ and $\Lambda'_D$.

5. The method according to claim 3, wherein the covariance matrix $G_B$ is a Kronecker product of a covariance matrix $G_{B,T}$ in a time domain and of a covariance matrix $G_{B,F}$ in a frequency domain and the covariance matrix $G_D$ is a Kronecker product of a covariance matrix $G_{D,T}$ in the time domain and of a covariance matrix $G_{D,F}$ in the frequency domain and the determining comprises:

decomposing the covariance matrices $G_{B,T}$ and $G_{B,F}$ into eigenvectors according to the relationships $G_{B,T}=C_{B,T}\Lambda_{B,T}C_{B,T}^H$ and $G_{B,F}=C_{B,F}\Lambda_{B,F}C_{B,F}^H$, wherein:
$C_{B,T}$ is a matrix of eigenvectors of the matrix $G_{B,T}$;
$\Lambda_{B,T}$ is a diagonal matrix comprising eigenvalues associated with the eigenvectors of the matrix $G_{B,T}$;
$C_{B,F}$ is a matrix of eigenvectors of the matrix $G_{B,F}$ and
$\Lambda_{B,F}$ is a diagonal matrix comprising eigenvalues associated with the eigenvectors of the matrix $G_{B,F}$;
extracting a matrix $C'_{B,T}$ from the matrix $C_{B,T}$ and a matrix $\Lambda'_{B,T}$ from the matrix $\Lambda_{B,T}$ the matrix $\Lambda'_{B,T}$ comprising a determined number $n_{Bt}'$ of largest eigenvalues of $\Lambda_{B,T}$ and the matrix $C'_{B,T}$ comprising the eigenvectors associated with said $n_{Bt}'$ largest eigenvalues;
extracting a matrix $C'_{B,F}$ from the matrix $C_{B,F}$ and a matrix $\Lambda'_{B,F}$ from the matrix $\Lambda_{B,F}$, the matrix $\Lambda'_{B,F}$ comprising a determined number $n_{Bf}'$ of largest eigenvalues of $\Lambda_{B,F}$ and the matrix $C'_{B,F}$ comprising the eigenvectors associated with said $n_{Bf}'$ largest eigenvalues,
decomposing the covariance matrices $G_{D,T}$ and $G_{D,F}$ into eigenvectors according to the relationships $G_{D,T}=C_{D,T}\Lambda_{D,T}C_{D,T}^H$ and $G_{D,F}=C_{D,F}\Lambda_{D,F}C_{D,F}^H$, wherein:
$C_{D,T}$ is a matrix of eigenvectors of the matrix $G_{D,T}$;
$\Lambda_{D,T}$ is a diagonal matrix comprising eigenvalues associated with the eigenvectors of the matrix $G_{D,T}$;
$C_{D,F}$ is a matrix of eigenvectors of the matrix $G_{D,F}$; and
$\Lambda_{D,F}$ is a diagonal matrix comprising eigenvalues associated with the eigenvectors of the matrix $G_{D,F}$;
extracting a matrix $C'_{D,T}$ from the matrix $C_{D,T}$ and a matrix $\Lambda'_{D,T}$ from the matrix $\Lambda_{D,T}$, the matrix $\Lambda'_{D,T}$ comprising a determined number $n_{Dt}'$ of largest eigenvalues of $\Lambda_{D,T}$ and the matrix $C'_{D,T}$ comprising the eigenvectors associated with said $n_{Dt}'$ largest eigenvalues; and
extracting a matrix $C'_{D,F}$ from the matrix $C_{D,F}$ and a matrix $\Lambda'_{D,F}$ from the matrix $\Lambda_{D,F}$, the matrix $\Lambda'_{D,F}$ comprising a determined number $n_{Df}'$ of the largest eigenvalues of $\Lambda_{D,F}$ and the matrix $C'_{D,F}$ comprising the eigenvectors associated with said $n_{Df}'$ largest eigenvalues,
the weighting vectors then being determined using matrices of eigenvectors $C'_{B,T}$, $C'_{B,F}$, $C'_{D,T}$, $C'_{D,F}$ and of eigenvalues $\Lambda'_{B,T}$, $\Lambda'_{B,F}$, $\Lambda'_{D,T}$, $\Lambda'_{D,F}$.

6. The method according to claim 1, wherein determining the signal demodulating comprises:
calculating a covariance matrix $G_B$ of the propagation channel;
determining weighting vectors using the covariance matrix $G_B$.

7. The method according to claim 6, wherein the determining the signal demodulating further comprises decomposing the covariance matrix $G_B$ into eigenvectors according to a relationship $G_B=C_B\Lambda_B C_B^H$ wherein $C_B$ is a matrix of eigenvectors of the matrix $G_B$ and $\Lambda_B$ is a diagonal matrix comprising eigenvalues associated with the eigenvectors of the matrix $G_B$.

8. The method according to claim 7, wherein the determining the signal demodulating further comprises extracting a matrix $C'_B$ from the matrix $C_B$ and a matrix $\Lambda'_B$ from the matrix $\Lambda_B$, the matrix $\Lambda'_B$ comprising a determined number $n_B'$ of eigenvalues of $\Lambda_B$ and the matrix $C'_B$ comprising the eigenvectors associated with said $n_B'$ eigenvalues, the weighting vectors then being determined using the matrix of eigenvectors $C'_B$ and of eigenvalues $\Lambda'_B$.

9. The method according to claim 7, wherein the covariance matrix $G_B$ is a Kronecker product of a covariance matrix $G_{B,T}$ in a time domain and of a covariance matrix $G_{B,F}$ in a frequency domain and the determining the signal demodulating comprises:

decomposing covariance matrices $G_{B,T}$ and $G_{B,F}$ into eigenvectors according to the relationships $G_{B,T}=C_{B,T}\Lambda_{B,T}C_{B,T}^H$ and $G_{B,F}=C_{B,F}\Lambda_{B,F}C_{B,F}^H$, wherein:
$C_{B,T}$ is a matrix of eigenvectors of the matrix $G_{B,T}$;
$\Lambda_{B,T}$ is a diagonal matrix comprising eigenvalues associated with the eigenvectors of the matrix $G_{B,T}$;
$C_{B,F}$ is a matrix of eigenvectors of the matrix $G_{B,F}$; and
$\Lambda_{B,F}$ is a diagonal matrix comprising eigenvalues associated with the eigenvectors of the matrix $G_{B,F}$;
extracting a matrix $C'_{B,T}$ from the matrix $C_{B,T}$ and a matrix $\Lambda'_{B,T}$ from the matrix $\Lambda_{B,T}$, the matrix $\Lambda'_{B,T}$ comprising a determined number $n_{Bt}'$ of the largest eigenvalues of $\Lambda_{B,T}$ and the matrix $C'_{B,T}$ comprising the eigenvectors associated with said $n_{Bt}'$ largest eigenvalues;
extracting a matrix $C'_{B,F}$ from the matrix $C_{B,F}$ and a matrix $\Lambda'_{B,F}$ from the matrix $\Lambda_{B,F}$, the matrix $\Lambda'_{B,F}$ comprising a determined number $n_{Bf}'$ of the largest eigenvalues of $\Lambda_{B,F}$ and the matrix $C'_{B,F}$ comprising the eigenvectors associated with these said $n_{Bf}'$ largest eigenvalues,
the weighting vectors then being determined using matrices of eigenvectors $C'_{B,T}$, $C'_{B,F}$ and of eigenvalues $\Lambda'_{B,T}$, $\Lambda'_{B,F}$.

10. The method according to claim 1, wherein the signal emitted is a multi-carrier signal.

11. The method according to claim 10, wherein the signal emitted is an OFDM signal.

12. A receiving equipment comprising at least two antennas each receiving a signal transmitted through an associated radio propagation channel, the signals received corresponding to a same emitted signal comprising time and frequency distributed symbol frames in which driver symbols are known to the receiving equipment, said method comprising means for:
noise whitening to form two combined signals that have noise components of which are separate;

normalising the noise components of the combined signals in order to form two signals (r', r") that have noise components which are separate and have equal average standards;

performing signal demodulation with a maximum combination of the signal-to-noise ratio on the two signals (r', r"), the noise components of which are separate and which have equal average standards, wherein the means of noise whitening to form the two combined signals comprises means for:

weighting each of the signals received with respective first weighting vectors ($w_1$; $w_2$) associated with a respective antenna of the receiving equipment, the signal associated with the first antenna being weighted by a weighting vector $w_1$ and the signal associated with the second antenna being weighted by a weighting vector $w_2$, combining the weighted received signals in order to form a first combined signal ($c_1$), weighting a reference signal comprising said driver symbols with another weighting vector, comparing the first combined signal and the weighted reference signal in order to form an error, determining the weighting vectors ($w_1$; $w_2$) using a maximum a posteriori criterion by maximising a probability of occurring of said weighting vectors ($w_1$; $w_2$) conditionally with the error obtained, weighting each signal received with second respective weighting vectors ($w^*_2$, $-w^*_1$), the signal received on the first antenna being weighted by a conjugate of a complex vector $w_2$ and the signal received on the second antenna being weighted by an opposite of the conjugate of a complex vector $w_1$, combining the signals received weighted by the second weighting vectors in order to form a second combined signal, wherein the receiving equipment further comprises means for determining respective coefficients of the propagation channel corresponding to a useful signal associated with the respective antenna of the receiving equipment and used in performing signal demodulation with the maximum combination of the signal-to-noise ratio on the two signals (r', r"), obtained at an end of the noise-whitening step, are determined using the maximum a posteriori criterion by maximising the probability of the occurring of the channel conditionally with the error present on the one hand in the first combined signal $c_1$ and on the other hand in the second combined signal $c_2$, by taking into account the propagation channel seen in the first combined signal $c_1$ and in the second combined signal $c_2$.

13. A non-transitory computer readable medium comprising instructions for the implementation of the method according to claim 1 when the instructions are executed by at least one processor.

* * * * *